Dec. 23, 1958 R. M. STALLARD 2,865,400
SOLENOID OPERATED AIR VALVE
Filed Feb. 25, 1957
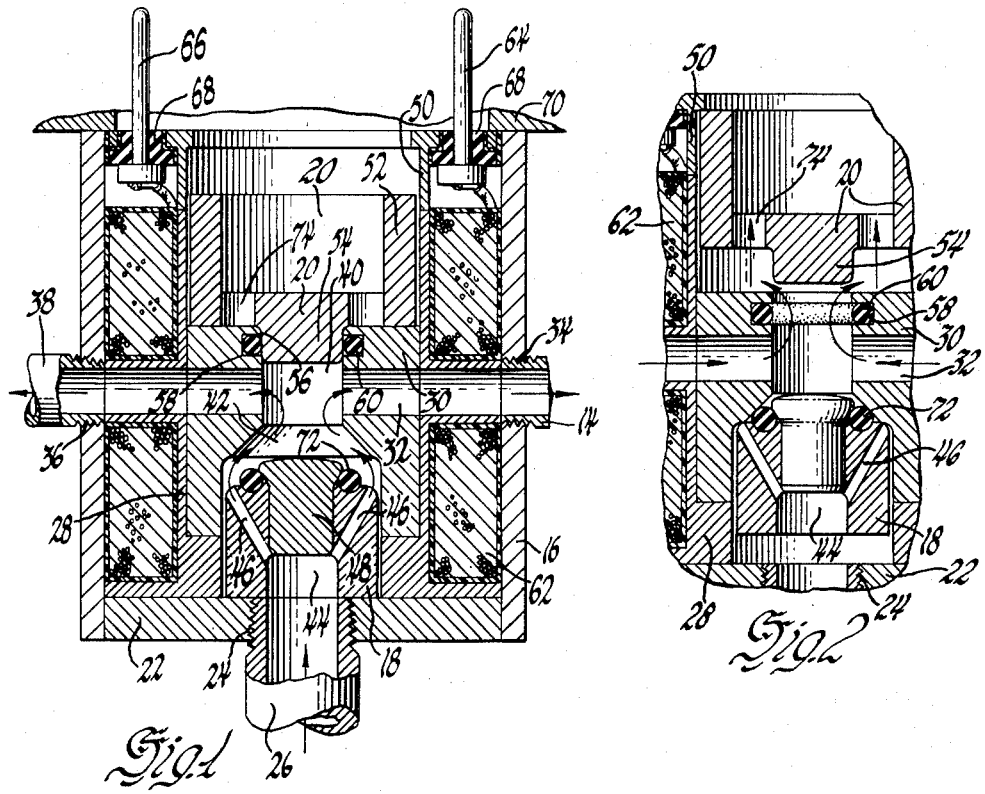
Fig. 1
Fig. 2
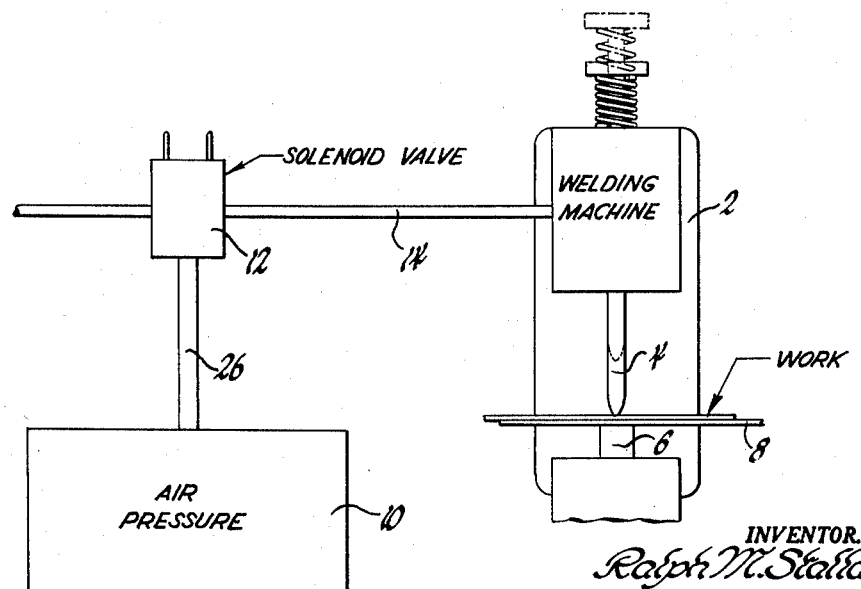
Fig. 3
INVENTOR.
Ralph M. Stallard
BY
R. C. Fowler
ATTORNEY

United States Patent Office 2,865,400
Patented Dec. 23, 1958

2,865,400

SOLENOID OPERATED AIR VALVE

Ralph M. Stallard, Utica, Mich., assignor to General Motors Corporation, Detroit, Mich., a corporation of Delaware Application February 25, 1957, Serial No. 641,994

4 Claims. (Cl. 137—623)

This invention relates to an electrically controlled air valve and more particularly to a solenoid valve controlling high pressure air flow.

The maintenance of solenoid air valves which control high air pressure fed to various factory operating machines is extensive and time-consuming. One example of such use is in welding machines where the high pressure is used to clamp the electrodes to the work prior to the application of electric power and to hold the work in place during the electric power application. These and other similar uses are very wearing on the control equipment and as a result a considerable amount of maintenance is necessary and time lost on machines is expensive.

It is an object in making the invention to provide a simple and effective solenoid controlled air valve.

It is a further object in making this invention to provide a miniature solenoid valve without springs in which a plurality of valves are actuated in proper sequence to control both the admission of air for operation and the exhaust of air for release.

It is also an object in making this invention to provide an efficient magnetic structure having minimum air gaps in the magnetic path for effective operation.

With these and other objects in view which will become apparent as the specification proceeds, my invention will be best understood by reference to the following specification and claims and the illustrations in the accompanying drawings in which:

Figure 1 is a vertical sectional view through a control valve embodying my invention and showing the parts in position for air inlet.

Figure 2 is a partial sectional view similar to Figure 1 showing the control valves in the opposite position for exhausting the air from the controls.

Figure 3 is a block diagram of a welding machine associated with the control valve and a source of air pressure.

My novel solenoid valve is adapted to control the flow of air and the application of air pressure to any operating mechanism such as a welding machine 2 in which air pressure causes the electrodes 4 and 6 to clamp the work 8 therebetween prior to the application of electric power. This air pressure may cause both electrodes to move toward each other for the clamping of the work or one electrode may be stationary and the air pressure only applied to cause movement of the other electrode. A source of air pressure 10 of the proper amount is connected to the solenoid valve 12 to supply air thereto and said valve is then connected directly through a supply line 14 to the welding machine 2 for the desired operation. The solenoid valve consists of an outer casing 16 which is formed of good magnetic material and which is cylindrical. Such a member may be formed of iron. Within said casing there are supported two movable valve members 18 and 20 for controlling the flow of air. It is to be noted that no springs are associated with either valve. An end plate 22 brazed or otherwise secured in place, closes the lower end of the cylinder 16 and has a central tapped opening 24 into which the input pipe 26 is threaded to supply input air under pressure. This plate also is magnetic and could be made of iron.

A subassembly surrounding the movable valves 18 and 20 includes an inner cylindrical case member 28 which may be formed of stainless steel and which houses a stationary chambered member 30 through which air may flow. The member 30 is of good magnetic material such as iron. This member contains a transverse channel 32 through which air may flow to any control mechanism to which it is desired to apply air pressure. This chamber is connected through a threaded opening 34 in one side of the housing 16 to an outlet pipe 14 to any mechanism to be operated and through a similar threaded opening 36 to a further supply pipe 38 for some other mechanism depending on how many devices it is desired to control simultaneously with the valve. The member 30 also has a vertical opening 40 which connects with the transverse channel 32 and includes a tapered expanding valve seat 42 above the top of the movable inlet valve 18. The valve 18 has a central bored portion 44 which is in alignment with the input line 26. A plurality of small channels 46 are bored through the valve at an angle to the center bored portion 44 and terminating at the upper end of the valve member 18. A mushroom-shaped plug 48 which is made of a non-magnetic material such as stainless steel is fixedly secured in the upper end of the center bore and extends above the upper surface of the main body of the valve. Mounted in the space around the top of the plug 48 is an O-ring 72 made of rubber or some similar deformable sealing material which is held in place by the enlarged head of the plug. When the valve 18 is moved upwardly, this O-ring seals against the slanting sides of the portion 42 to close the valve and thus prevents air from flowing from the input line 26 to the transverse lines 32.

The upper valve 20 is adapted to slide within the upper portion 50 of the member 28 and may be termed the exhaust valve. It has a main cylindrical body 52 which may rest upon the upper surface of the central member 30. It also has a centrally extending portion 54 of smaller diameter which is adpated to extend down into an opening 56 in the member 30 and to close the same. A groove 58 in the side wall of opening in the member 30 supports an O-ring 60 which again is a deformable sealing ring and adapted to seal the opening between the valve and the projecting portion 54 extending downwardly. The solenoid winding 62 for operating said valve is wound on the outside of the subassembly 28. A pair of terminals 64 and 66 are mounted at the upper end of the valve assembly in insulating bushings 68 for connection to the leads for the winding 62 to supply electrical power thereto. The solenoid valve is adapted to be secured by any suitable means to a framework indicated at 70.

With the above general description, the operation of the valve will now be described in detail. In Figure 1 the valves 18 and 20 are shown in their energized position illustrating the application of air pressure to a desired control unit. Figure 2 on the other hand, illustrates the deenergized position or that during which air is exhausted from the control means. Assuming that the valve is in its deenergized position as shown in Figure 2, the upper exhaust valve 20 is merely floating and may be pushed upwardly by any air pressure within the control lines to the welding machine. It is maintained from expulsion from the device by the end of the casing. At this time maximum air pressure from the reservoir 10 is applied in the cavity 44 at the bottom of the inlet valve 18. This air pressure holds the valve 18 in its upper position, sealing the O-ring 72 against the tapered sides of the valve seat 42 thus no air can pass into the distributing chamber 32. At the same time any pressure within the said distributing lines 32 will cause the valve 20 to rise permitting such air to flow out through openings 74 in said valve 20 as soon as it rises from its seat.

Assuming now that the operator closes the electric circuit to energize solenoid winding 62, the floating valve 20 will first be brought down into engagement with its seat on the upper surface of member 30 since there is substantially no restraining force to maintain it off the seat. This will seal the exhaust valve through engagement of the projecting portion 54 against the sealing O-ring 60. With this exhaust valve closure, the only remaining air gap in the magnetic circuit inside the coil is that between the lower surface of the inlet valve 18 and the end plate 22, and the input valve 18 will then be quickly pulled downwardly by the magnetic force to open a conductive air path over the top. The magnetic force must overcome the force of the line air pressure in doing so. Air will then flow from the input line 26 through the channels 46 up into the distributing channels 32 to operate desired apparatus. So long as the solenoid is energized, air is supplied to the control apparatus. As soon as the solenoid coil is deenergized, air pressure immediately causes the valve 18 to rise and seal with its valve seat and any pressure existent in the system may be exhausted through the exhaust valve 20.

In fabricating the magnetic valve, stainless steel subassembly 28 is first taken and the central chambered member 30 inserted and secured in place thereon. The O-ring is snapped into the groove 58 and the solenoid wound on the outer surface. The end plate 22 is secured in the end of the housing 16 by brazing and then the subassembly 28, including the input valve 18, inserted through the upper end. The terminals are inserted prior to the general assembly and when the solenoid assembly is fixedly mounted to other means, such as support 70, the parts are maintained in assembled condition.

I claim:

1. In a fluid control valve, a housing of magnetic material having interconnecting channels therein, a casing surrounding said housing, and extending beyond opposite ends of the same, a coil mounted on the casing to provide a magnetic field when energized, a first movable valve means formed of magnetic material mounted in one end of the casing and having a protruding section that extends into the end of one channel in the housing to prevent flow therethrough and which when in said closed position seats upon the end of the housing to provide a minimum air gap at that part of the magnetic circuit, a second valve means of magnetic material movably mounted in the other end of the casing in one of the channels, means for applying fluid pressure to the second valve means, fluid pressure applied thereto tending to force the valve toward the housing and seal the channel to flow therethrough, said second valve being so located in the magnetic field of the coil that the magnetic field tends to move the second valve means in the opposite direction to that of the fluid pressure and permit the fluid pressure to flow into the housing.

2. In a fluid control valve means, a central housing having a plurality of intersecting channels, said housing being formed of magnetizable material, a plurality of magnetic valve means mounted in opposed relation in opposite ends of one of the channels and projecting into the channel in the housing, a casing surrounding the assembly of the magnetic valve means in the housing, said magnetic valve means being slidably supported therein, energizable electrical coil means mounted around the casing and providing a strong magnetic field, said magnetic valve means being so located within the magnetic field of the coil that they both tend to move in the same direction when the electrical coil is energized to close one channel section to flow and open the other channel section.

3. In a fluid control valve, a housing formed of magnetizable material having channels therein which intersect, a first control valve formed of magnetizable material movably mounted at one side of the housing and having a protruded section which extends into the end of one channel to control flow through the same, a second control valve formed of magnetizable material mounted in the opposite end of the first named channel said channel having a valve seat formed therein, said second control valve being so mounted as to be movable into a seating position, with said valve seat to control the flow through the channel on its side, said second valve having openings therethrough of greater diameter than the valve seat so that when the valve is moved away from the seat fluid may flow through these openings from the central part of the valve to establish pressure in the channels, and a magnetizing coil mounted around the assembly of the housing and valves to cause said valves to move in the same direction upon energization, closing one channel to flow therethrough and permitting flow through the second.

4. In a fluid control valve, a housing formed of magnetizable material having channels therein which intersect, the first control valve formed of magnetizable material movably mounted at one side of the housing and having a protruded section which extends into the end of one channel to control the flow through the same, a second control valve formed partially of magnetizable material and slidably mounted in an enlarged end of one of the channels, said enlarged end of said channel having a tapered valve seating surface adjacent the inner end against which the valve seats to control flow therethrough, elongated canals through said second control valve permitting fluid flow at a diameter larger than the tapered valve seating surface so that when the valve is retracted fluid can flow from the center of the valve and thence through the valve seating surface into the main channels, sealing means mounted on the end of the second valve to engage the tapered valve seating surface for closure purposes and energizable coil means mounted around the assembly of the housing and first and second valves so located and arranged as to cause both valves to move in the same direction sequentially upon energization or deenergization.

References Cited in the file of this patent

UNITED STATES PATENTS

| 1,281,543 | Farmer | Oct. 15, 1918 |
| 2,682,984 | Melikian | July 6, 1954 |

FOREIGN PATENTS

| 575,440 | Great Britain | Feb. 18, 1946 |
| 726,379 | Great Britain | Mar. 16, 1955 |